F. P. LIVINGSTON.
CONDENSER FOR AUTOMOBILE RADIATORS.
APPLICATION FILED JUNE 9, 1920.
1,431,965.
Patented Oct. 17, 1922.
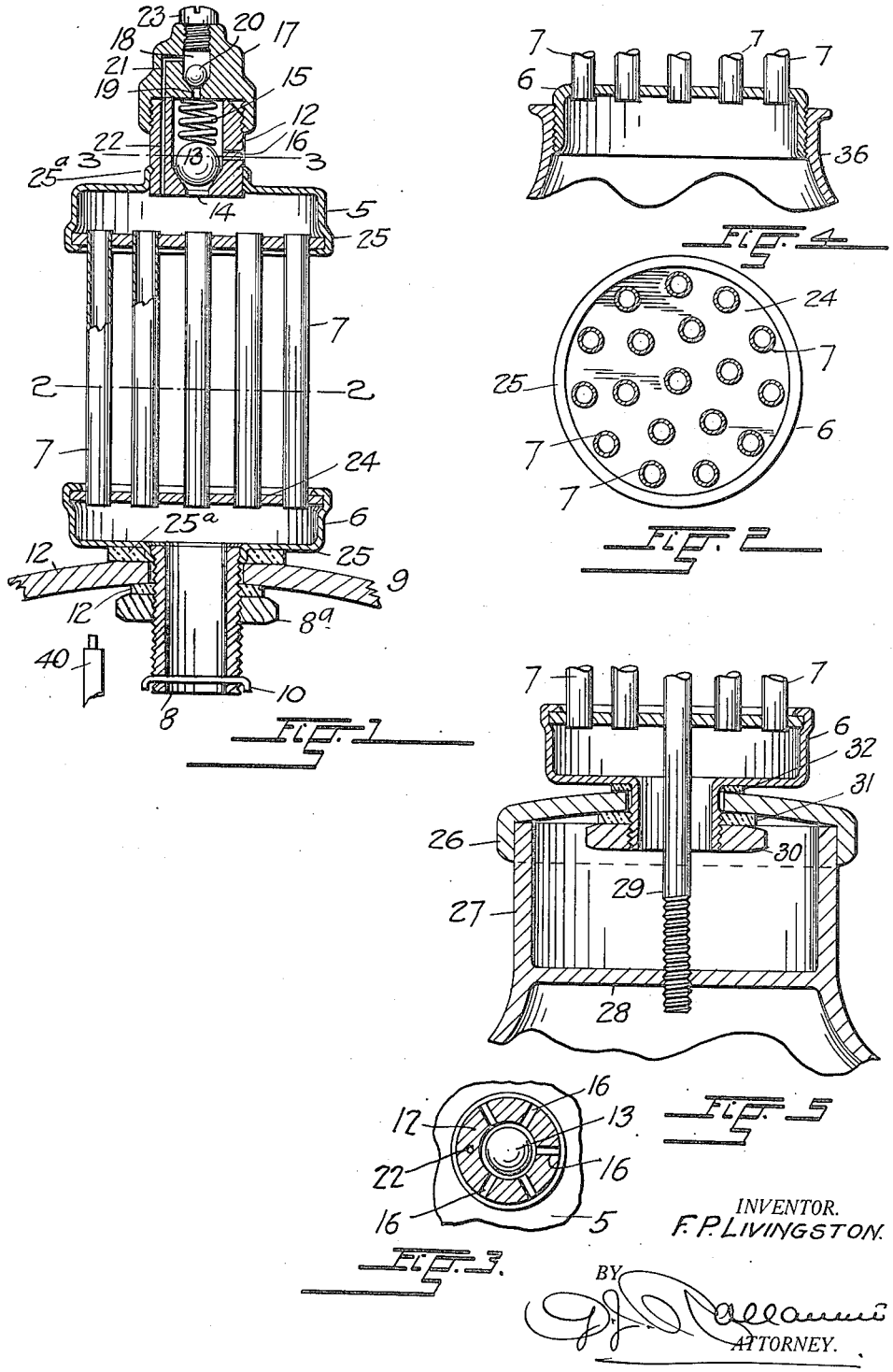
INVENTOR.
F. P. LIVINGSTON.
BY
ATTORNEY.

Patented Oct. 17, 1922.

1,431,965

UNITED STATES PATENT OFFICE.

FREMONT P. LIVINGSTON, OF DENVER, COLORADO.

CONDENSER FOR AUTOMOBILE RADIATORS.

Application filed June 9, 1920. Serial No. 387,666.

*To all whom it may concern:*

Be it known that I, FREMONT P. LIVINGSTON, a citizen of the United States, residing at Denver, in the county of Denver and State of Colorado, have invented certain new and useful Improvements in Condensers for Automobile Radiators, of which the following is a specification.

This invention relates to improvements in condensers for automobile radiators, and its primary object is to provide a condensing device of simple and practical construction which may be fastened in the filler neck of automobile radiators without altering their construction or hindering their regular operation and which has simple and efficient means to automatically regulate the air and vapor pressures in the radiator.

By the use of my invention the vapors constantly evolved in the radiator, especially when in freezing weather a certain amount of alcohol is mixed with the water, are cooled and returned in liquid form thereby reducing the usual loss of liquid and retard "boiling" of the liquid in the radiator, which frequently occurs as a result of the use of alcohol or other volatile fluid.

With these and other objects in view, my invention consists in the novel features of construction and combinations of parts shown in their preferred form in the accompanying drawings in the several views of which like parts are similarly designated and in which—

Figure 1 represents a sectional elevation of my improved condenser in its operative position;

Figure 2, a transverse section on the line 2—2, Figure 1;

Figure 3, a section taken on the line 3—3, Figure 1;

Figure 4, a fragmentary sectional view of the lower portion of the condenser showing a modification in its construction which adapts it for use on Ford autombiles;

Figure 5, a sectional view of another modification of the lower portion of the condenser in its operative position on the radiator of an Overland automobile.

Referring to the drawings, my improved condenser comprises upper and lower hollow heads 5 and 6 connected by a series of flues 7, the lower head 6 having an exteriorly screw-threaded hollow neck 8 for its connection with the radiator.

In the form of my invention shown in Figure 1 the neck extends through a correspondingly threaded opening of a radiator cap 9 of the kind ordinarily used for closing the filler neck of an automobile radiator of standard construction.

The condenser is secured against displacement on the cap by a nut $8^a$, and rubber or fiber gaskets 12 placed at opposite sides of the cap prevent possible leakage of fluid around the threaded connection.

A hollow plug 12 connected in a central opening of the upper head, constitutes the housing of a valve 13 which normally closes an exhaust-port 14 connected with the interior of the condenser.

A coiled spring 15 yieldingly holds the valve upon its seat and one or more openings 16 in the wall of the housing provide an outlet for escaping vapors when the valve is lifted by their pressure.

The open upper end of the valve housing is closed by a screw cap 17 which has a valve chamber 18 in connection with the other. The passage 19 between the two valve-chambers is normally closed by a gravity-valve 20 and the upper chamber is in constant connection with the interior of the condenser by ducts 21 and 22 formed respectively in the cap and the plug and connected with the space between them.

The open upper end of the cap is normally closed by a screw 23 which affords ready access to its valve chamber.

A simple method of constructing and assembling the parts of my improved condenser has been shown in the drawings in which the two heads are composed of plates 24 to which the flues 7 are fastened by a flow of solder, and casings 25 made of spun metal which are clamped around the peripheral edges of the plates.

The two casings have upset rims $25^a$ around their openings for the connection of the neck 8 and the plug 12 which to this end have exterior grooves into which the edges of the rims are pressed.

I desire it understood, however, that while the construction as shown and described is preferable by reason of its simplicity and effectuality, other methods of forming and assembling the parts may be employed without departing from the principle of my invention.

In the operation of my invention the cap to which the condenser is attached, is, as usual, screwed upon the filler neck of an automobile radiator. The vapors evolved within the radiator rise through the hollow neck of the condenser into the lower head of the same and pass through the flues into the upper head.

The vapors while rising in the flues which are constantly exposed to the atmosphere, are cooled by contact with the walls thereof and finally condensed, the condensate draining from the upper head downwardly through the flues and returning to the radiator from the lower head.

In case a vacuum is formed in the radiator, collapsing of the thin radiating surfaces by external pressure is prevented by the admission of air past the valve 20 which is lifted by the air entering the valve chamber 12 through the openings 16.

The air entering the upper valve chamber past the lifted valve is free to enter the radiator through the connected ducts 21 and 22 which connect the chamber with the interior of the condenser, and thus automatically dispels the vacuum in the radiator whenever the pressure above the fluid therein falls below that of the atmosphere.

Should an excess of vapors increase the pressure in the radiator beyond the limits of safety, the valve 13 is lifted against the pressure of its spring, thereby permitting a direct escape of vapors from the radiator to the atmosphere until their pressure is again below the maximum predetermined by the strength of the spring, or, in case the spring is omitted, by the weight of the valve.

The condenser as shown and described may be attached to any cap of standard make by drilling a hole to receive the threaded neck.

On Ford automobiles the radiator cap is of smaller proportions and threaded to screw inside the filler neck 36 instead of exteriorly thereof, and the condenser is adapted for its connection with the radiator by the use of a lower head which is open at its bottom and exteriorly threaded to fit the thread of the filler neck as shown in Figure 4.

In Overland automobiles the cap 16 is clamped upon the filler neck 27 by a screw which passes through a threaded opening of a bridge 28 at the lower end thereof.

In order to adapt my condenser for use in connection with a cap of this character, the central flue is replaced by a rod 29 which is threaded at its lower end to cooperate with the thread in the opening of the bridge, and the neck of the condenser which passes through an opening in the cap, as before, is secured by a nut 30 screwed upon its lower end, resilient gaskets 31 and 32 being placed at opposite sides of the cap to seal the connection.

Having thus described my invention what I claim and desire to secure by Letters-Patent is:

1. A condenser for use on an automobile-radiator, having heat dissipating means a valve-chamber connected with said means and having a port connecting with the atmosphere, and a gravity valve closing said port and adapted to be lifted by a partial vacuum in the radiator.

2. A condenser for use on an automobile radiator, comprising a lower chamber having means for its connection with the interior of the radiator, an upper chamber, flues connecting the chambers, a valve chamber connected with the atmosphere and having a port connected with the upper chamber of the condenser, a second valve chamber having a port connecting with the first valve-chamber and a duct connecting with the condenser, a valve closing the port of the first chamber and adapted to be lifted by excessive pressure in the radiator, and a valve closing the port of the second chamber and adapted to be lifted by a partial vacuum in the radiator.

3. A condenser for use on an automobile radiator, comprising upper and lower heads and flues connecting the same, the upper head having two connected valve chambers constantly open to the atmosphere, a spring-pressed valve in one of the chambers controlling the admission of a fluid from the flues, and a gravity valve controlling the connection between the chambers.

4. A condenser for use on an automobile radiator comprising a lower chamber having means for its connection with the radiator, an upper chamber, upright flues connecting the chambers, and a gravity valve adapted to connect the upper chamber with the atmosphere by a partial vacuum in the radiator.

5. The combination with an automobile radiator having vapor-condensing means, of an element in communication with the vapor-space of the radiator and including two valve-chambers and ports therein for connecting the vapor-space with the atmosphere, and gravity valves in said chambers controlling the flow of fluid between said ports and movable respectively by an excess of pressure and by a partial vacuum in said vapor space.

6. The combination with an automobile radiator having vapor-condensing means, of an element in communication with the vapor-space of the radiator, and including a valve-chamber connected with the atmosphere and having a port connected with said vapor-space, a second valve chamber having a port connecting with the first valve-chamber and a duct connecting with the vapor-space, a valve closing the port of the first chamber and adapted to be lifted by excessive pressure in the radiator, and a valve closing the port of the second chamber and adapted to be lifted by a partial vacuum in the radiator.

In testimony whereof I have affixed my signature.

FREMONT P. LIVINGSTON.